United States Patent
Baek et al.

(10) Patent No.: US 10,639,966 B2
(45) Date of Patent: May 5, 2020

(54) AIR CONDITIONING SYSTEM FOR MOTOR VEHICLES

(71) Applicant: Hanon Systems, Daejeon (KR)

(72) Inventors: Chang Hyun Baek, Daejeon (KR); Chul Soon Kim, Daejeon (KR); Tae Eun Kim, Daejeon (KR); Se Won Min, Daejeon (KR); Sang Jun Yoo, Daejeon (KR); Hong Rae Jung, Daejeon (KR); Seo Jun Yoon, Daejeon (KR); Seung Ho Lee, Daejeon (KR); Jae Min Lee, Daejeon (KR); Young Chul Kim, Daejeon (KR); In Hyeok Kim, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 127 days.

(21) Appl. No.: 15/935,629

(22) Filed: Mar. 26, 2018

(65) Prior Publication Data

US 2018/0281564 A1    Oct. 4, 2018

(30) Foreign Application Priority Data

Mar. 27, 2017  (KR) .................. 10-2017-0038401
Sep. 14, 2017  (KR) .................. 10-2017-0117564

(51) Int. Cl.
*B60H 1/32*   (2006.01)
*F25B 5/02*   (2006.01)
(Continued)

(52) U.S. Cl.
CPC .......... *B60H 1/323* (2013.01); *B60H 1/00878* (2013.01); *B60H 1/3216* (2013.01); *B60H 1/3223* (2013.01); *F25B 5/02* (2013.01); *F25B 49/02* (2013.01); *B60H 2001/00928* (2013.01); *B60H 2001/00949* (2013.01); *B60H 2001/3261* (2013.01); *B60H 2001/3283* (2013.01); *B60H 2001/3285* (2013.01);
(Continued)

(58) Field of Classification Search
CPC ........ F25B 49/02; F25B 5/02; F25B 2600/23; F25B 2600/2513; F25B 2700/2117; F25B 2600/0253; B60H 1/323; B60H 1/3223; B60H 1/00878; B60H 1/3216; B60H 2001/3285; B60H 2001/00949; B60H 2001/3289; B60H 2001/00928; B60H 2001/3261; B60H 2001/3283
See application file for complete search history.

(56) References Cited

U.S. PATENT DOCUMENTS

2010/0024450 A1*  2/2010  Waldschmidt ......... B60H 1/323
                                                              62/115
2010/0064700 A1*  3/2010  Ziehr .................... B60H 1/323
                                                              62/84
(Continued)

*Primary Examiner* — Frantz F Jules
*Assistant Examiner* — Martha Tadesse
(74) *Attorney, Agent, or Firm* — Norton Rose Fulbright US LLP; James R. Crawford

(57) ABSTRACT

An air conditioning system for motor vehicles includes a compressor, a condenser, a plurality of air conditioning units connected in parallel with each other with respect to the compressor and the condenser, and a flow rate control unit configured to, when a specific one of the air conditioning units is additionally turned on or is turned off, prevent occurrence of a sudden change in refrigerant amount in the remaining air conditioning units.

6 Claims, 12 Drawing Sheets

(51) Int. Cl.
    *B60H 1/00*   (2006.01)
    *F25B 49/02*  (2006.01)
(52) U.S. Cl.
    CPC ............... *B60H 2001/3289* (2013.01); *F25B 2600/0253* (2013.01); *F25B 2600/23* (2013.01); *F25B 2600/2513* (2013.01); *F25B 2700/2117* (2013.01)

(56) References Cited

U.S. PATENT DOCUMENTS

| | | | | |
|---|---|---|---|---|
| 2016/0339766 | A1* | 11/2016 | Choi | B60H 1/00921 |
| 2017/0218507 | A1* | 8/2017 | Kim | H01L 21/67109 |
| 2018/0117989 | A1* | 5/2018 | Min | B60H 1/00807 |

* cited by examiner

AIR CONDITIONING SYSTEM FOR MOTOR VEHICLES

CROSS-REFERENCE TO RELATED PATENT APPLICATIONS

This application claims the benefit of each of Korean Patent Application No. 10-2017-0038401 dated Mar. 27, 2017 and Korean Patent Application No. 10-2017-0117564 dated Sep. 14, 2017. The disclosures of the above patent applications are hereby incorporated herein by reference in their entirety.

TECHNICAL FIELD

The present invention relates to an air conditioning system for motor vehicles, and more particularly, to an air conditioning system for motor vehicles which includes a plurality of air conditioning units for independently heating and cooling a plurality of regions of a passenger compartment. The air conditioning system is capable of preventing a sudden change in refrigerant flow rate in the remaining air conditioning units when one of the air conditioning units is additionally turned on or off and capable of preventing a decrease in cooling performance of the air conditioning units due to the sudden change in refrigerant flow rate and preventing a sudden change in temperature of an air discharged into a passenger compartment.

BACKGROUND ART

In recent years, a multi-zone type air conditioning system has been developed in which a plurality of regions in a passenger compartment is independently cooled and heated. For example, an air conditioning system for independently cooling and heating a front seat region and a rear seat region in a passenger compartment has been developed and used.

As shown in FIG. 1, the air conditioning system includes a compressor 10, a condenser 12, a front seat air conditioning unit 20 for cooling a front seat region in a passenger compartment, and a rear seat air conditioning unit 30 for cooling a rear seat region in the passenger compartment.

The front seat air conditioning unit 20 includes an expansion valve 22, an evaporator 24 and a blower 26 for blowing a cold air of the evaporator 22 to the front region in the passenger compartment.

The rear seat air conditioning unit 30 is installed in parallel with the front seat air conditioning unit 20 with respect to the compressor 10 and the condenser 12. The rear seat air conditioning unit 30 includes an expansion valve 32, an evaporator 34 and a blower 36 for blowing a cold air of the evaporator 34 to the rear region in the passenger compartment.

As shown in FIG. 2, the air conditioning system may further include a battery air conditioning unit 40 if such a need arises.

The battery air conditioning unit 40 is installed in parallel with the front seat air conditioning unit 20 and the rear seat air conditioning unit 30 with respect to the compressor 10 and the condenser 12. The battery air conditioning unit 40 includes an expansion valve 42 and an evaporator 44. The battery air conditioning unit 40 delivers the cold air generated in the evaporator 44 to a high-voltage battery (not shown) of a motor vehicle, thereby cooling the high-voltage battery.

In such a conventional air conditioning system, when at least one air conditioning unit among the plurality of air conditioning units 20, 30, and 40 is already turned on and the remaining air conditioning units are then turned on, a sudden change in refrigerant flow rate may occur in the air conditioning unit in operation. Thus, the temperature of the air discharged into the passenger compartment may become unstable.

For example, when at least one of the rear seat air conditioning unit 30 and the battery air conditioning unit 40 is operated (turned on) while only the front seat air conditioning unit 20 is in operation, the refrigerant of the compressor 10 supplied only to the front seat air conditioning unit 20 is dispersed toward the rear seat air conditioning unit 30 or the battery air conditioning unit 40. In the present invention, the operation of the rear seat air conditioning unit 30 will be described as an example.

Therefore, as shown in FIG. 3A, the amount of the refrigerant supplied to the front seat air conditioning unit 20 sharply decreases. Specifically, the amount of the refrigerant supplied to the front seat air conditioning unit 20 rapidly decreases at the time when the expansion valve 34 of the rear seat air conditioning unit 30 is turned on. This leads to a sharp decrease in the cooling performance of the front seat air conditioning unit 20.

As a result, as shown in FIG. 3B, the temperature of the air discharged to the front seat region rapidly increases from the time when the rear seat air conditioning unit 30 is operated. Thus, the cooling effect of the front seat region is significantly reduced.

Particularly, the temperature of the air discharged to the front seat region is changed until the flow rate of the refrigerant of the front seat air conditioning unit 20 is made stable by way of the control of a refrigerant flow rate in the expansion valve 22. Thus, the cooling effect of the front seat region is significantly reduced. As a result, the comfort in the front seat region is deteriorated.

In the conventional air conditioning system, as shown in FIG. 2, if one of the air conditioning units is turned off in a state in which at least two of the front seat air conditioning unit 20, the rear seat air conditioning unit 30 and the battery air conditioning unit 40 are in operation, for example, if the rear seat air conditioning unit 30 is turned off in a state in which the front seat air conditioning unit 20 and the rear seat air conditioning unit 30 are in operation, the refrigerant supplied to the rear seat air conditioning unit 30 is concentrated on the front seat air conditioning unit 20.

Therefore, as shown in FIG. 4C, the amount of the refrigerant on the side of the front seat air conditioning unit 20 suddenly increases. Specifically, the amount of the refrigerant on the side of the front seat air conditioning unit 20 suddenly increases at the time when the expansion valve 34 of the rear seat air conditioning unit 30 is turned off. Thus, the cooling performance of the front seat air conditioning unit 20 is excessively increased.

As a result, as shown in FIG. 4D, the temperature of the air discharged to the front seat region is excessively lowered from the time when the rear seat air conditioning unit 30 is turned off. Eventually, the front seat region is overcooled.

Particularly, the temperature of the air discharged to the front seat region is changed until the flow rate of the refrigerant of the front seat air conditioning unit 20 is made stable by way of the control of a refrigerant flow rate in the compressor 10 or the expansion valve 22. Thus, the front seat region is overcooled. As a result, the comfort of the front seat region is significantly deteriorated.

SUMMARY OF THE INVENTION

In view of the aforementioned problems inherent in the related art, it is an object of the present invention to provide an air conditioning system for motor vehicles capable of preventing a sudden change in refrigerant flow rate when one of a plurality of air conditioning units is additionally turned on in a state in which the remaining one or more of the air conditioning units are already turned on.

Another object of the present invention is to provide an air conditioning system for motor vehicles capable of preventing a decrease in cooling performance of air conditioning units due to a sudden change in refrigerant flow rate and preventing a sudden change in temperature of an air discharged into a passenger compartment.

A further object of the present invention is to provide an air conditioning system for motor vehicles capable of, when one of a plurality of air conditioning units is turned off in a state in which the remaining air conditioning units are turned on, preventing a sudden change in refrigerant flow rate in the remaining air conditioning units.

A still further object of the present invention is to provide an air conditioning system for motor vehicles capable of enhancing the comfort in a passenger compartment.

In order to achieve the above objects, there is provided an air conditioning system for motor vehicles, including: a compressor; condenser; a plurality of air conditioning units connected in parallel with each other with respect to the compressor and the condenser; and a flow rate control unit configured to, when a specific one of the air conditioning units is additionally turned on or is turned off, prevent occurrence of a sudden change in refrigerant amount in the remaining air conditioning units.

The flow rate control unit may include a microcomputer configured to, when at least one of the air conditioning units not in a turned-on state is additionally turned on in a state in which one or more of the air conditioning units are already turned on, increase in advance a refrigerant amount in the already-turned-on air conditioning units and operate the additionally-turned-on air conditioning unit after a lag for a specified time without immediately operating the additionally-turned-on air conditioning unit.

The microcomputer may be configured to, when a specific one of the air conditioning units is turned off in a state in which the air conditioning units are turned on, reduce in advance the refrigerant amount in the turned-on air conditioning units and turn off the specific one of the air conditioning units after a lag for a specified time without immediately turning off the specific one of the air conditioning units.

The flow rate control unit may include; a plurality of opening/closing valves controlled to cut off or permit a flow of a refrigerant to the air conditioning units; and a microcomputer configured to turn on and off the opening/closing valves two or more times at an initial time of turning on or off the opening/closing valves.

According to the air conditioning system for motor vehicles, when one of a plurality of air conditioning units is additionally turned on in a state in which the remaining one or more of the air conditioning units are already turned on, the refrigerant amount in the already-turned-on air conditioning units is increased in advance without immediately operating the additionally-turned-on air conditioning unit. This makes it possible to compensate for a decrease in refrigerant amount on the side of the already-turned-on air conditioning units, which may occur when operating the additionally-turned-on air conditioning unit. As a result, it is possible to prevent a sudden change in refrigerant flow rate which may occur when operating the additionally-turned-on air conditioning unit.

Furthermore, when a specific one of a plurality of air conditioning units is turned off in a state in which the plurality of air conditioning units are turned on, the refrigerant amount in the turned-on air conditioning units is reduced in advance without immediately turning off the specific one of the air conditioning units. This makes it possible to compensate for an increase in refrigerant flow rate in the remaining air conditioning units, which may occur when turning off the specific one of the air conditioning units. As a result, it is possible to prevent a sudden change in refrigerant flow rate which may occur when turning off the specific one of the air conditioning units.

Furthermore, when one or more air conditioning units are already turned on and another air conditioning unit is additionally turned on, the opening/closing valve on the side of the expansion valve of the additionally turned-on air conditioning unit is repeatedly turned on and off a predetermined number of times at a predetermined time interval and is then turned on. This makes it possible to prevent a sudden change in refrigerant flow rate which may occur as another air conditioning unit is additionally operated (turned on).

Furthermore, when a plurality of air conditioning units is turned on and a specific one of the plurality of air conditioning units is turned off, the opening/closing valve on the side of the expansion valve of the specific one of the air conditioning units is repeatedly turned on and off a predetermined number of times at a predetermined time interval and is then turned off. This makes it possible to prevent a sudden change in refrigerant flow rate which may occur as the specific one of the air conditioning units is turned off.

Furthermore, it is possible to prevent a change in cooling performance of the air conditioning units due to the sudden change in refrigerant flow rate and to prevent a sudden change in temperature of a discharged air.

Furthermore, it is possible to remarkably enhance the comfort in a passenger compartment.

BRIEF DESCRIPTION OF THE DRAWINGS

FIG. 3 is a graph showing an operation example of a conventional air conditioning system for motor vehicles and showing the relationship between a change in refrigerant flow rate in a front seat air conditioning unit and a rear seat air conditioning unit, a change in temperature of an air discharged toward a front seat region, a change in refrigerant flow rate in the entire air conditioning system, and control of a refrigerant flow rate through a compressor or an expansion valve, when the rear seat air conditioning unit is additionally turned on in a state in which the front seat air conditioning unit is already turned on.

FIG. 4 is a graph showing an operation example of a conventional air conditioning system for motor vehicles and showing the relationship between a change in refrigerant flow rate in a front seat air conditioning unit and a rear seat air conditioning unit, a change in temperature of an air discharged toward a front seat region, a change in refrigerant flow rate in the entire air conditioning system, and control of a refrigerant flow rate through a compressor or an expansion valve, when the rear seat air conditioning unit is turned off in a state in which the front seat air conditioning unit and the rear seat air conditioning unit are turned on.

FIG. 6 is a graph showing an operation example of the air conditioning system for motor vehicles according to the first embodiment of the present invention and showing the relationship between a change in refrigerant flow rate in a front seat air conditioning unit and a rear seat air conditioning unit, a change in temperature of an air discharged toward a front seat region, a change in refrigerant flow rate in the entire air conditioning system, and control of a refrigerant flow rate through a compressor or an expansion valve, when the rear seat air conditioning unit is additionally turned on in a state in which the front seat air conditioning unit is already turned on.

FIG. 7 is a graph showing an operation example of the air conditioning system for motor vehicles according to the first embodiment of the present invention and showing the relationship between a change in refrigerant flow rate in a front seat air conditioning unit and a rear seat air conditioning unit, a change in temperature of an air discharged toward a front seat region, a change in refrigerant flow rate in the entire air conditioning system, and control of a refrigerant flow rate through a compressor or an expansion valve, when the rear seat air conditioning unit is turned off in a state in which the front seat air conditioning unit and the rear seat air conditioning unit are turned on.

FIG. 9 is a graph showing an operation example of the air conditioning system for motor vehicles according to the second embodiment of the present invention and showing the relationship between a change in refrigerant flow rate in a front seat air conditioning unit and a rear seat air conditioning unit, a change in temperature of an air discharged toward a front seat region and a change in refrigerant flow rate in the entire air conditioning system, when the rear seat air conditioning unit is additionally turned on in a state in which the front seat air conditioning unit is already turned on.

FIG. 10 is a graph showing an operation example of the air conditioning system for motor vehicles according to the second embodiment of the present invention and showing the relationship between a change in refrigerant flow rate in a front seat air conditioning unit and a rear seat air conditioning unit, a change in temperature of an air discharged toward a front seat region and a change in refrigerant flow rate in the entire air conditioning system, when the rear seat air conditioning unit is turned off in a state in which the front seat air conditioning unit and the rear seat air conditioning unit are turned on.

MODE FOR CARRYING OUT THE INVENTION

Figure 1:
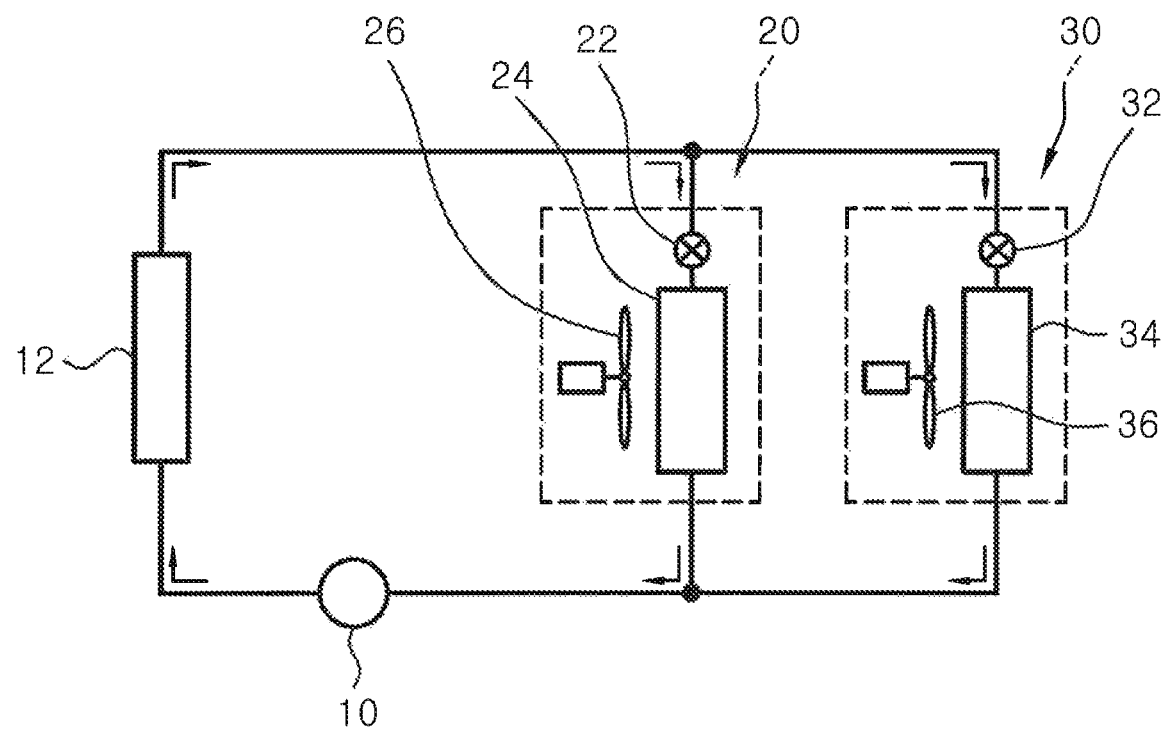
FIGS. 1 and 2 are views showing conventional air conditioning system for motor vehicles.
Figure 2:
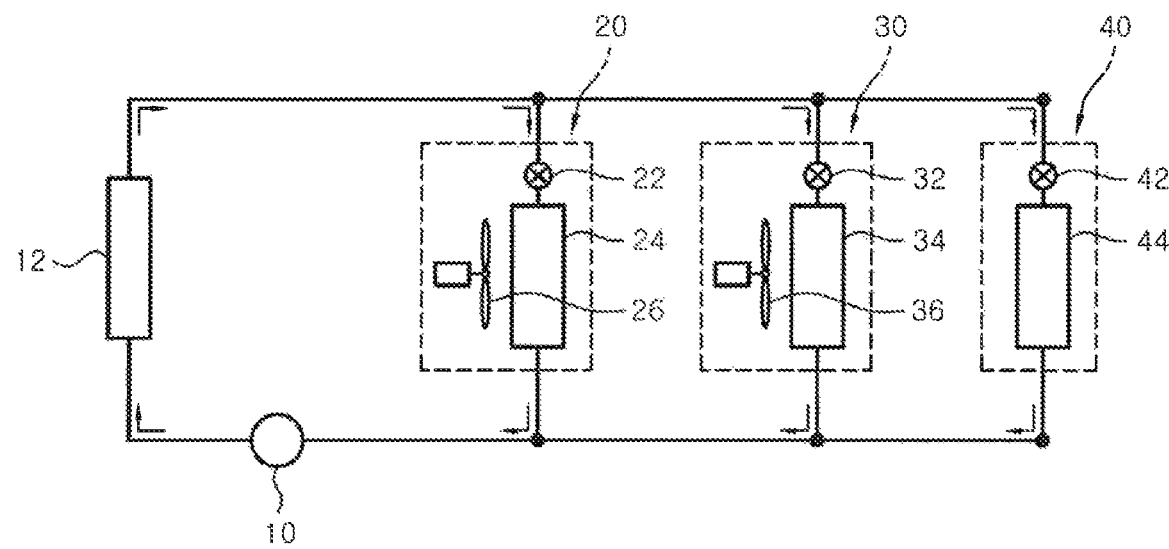
Figure 3:
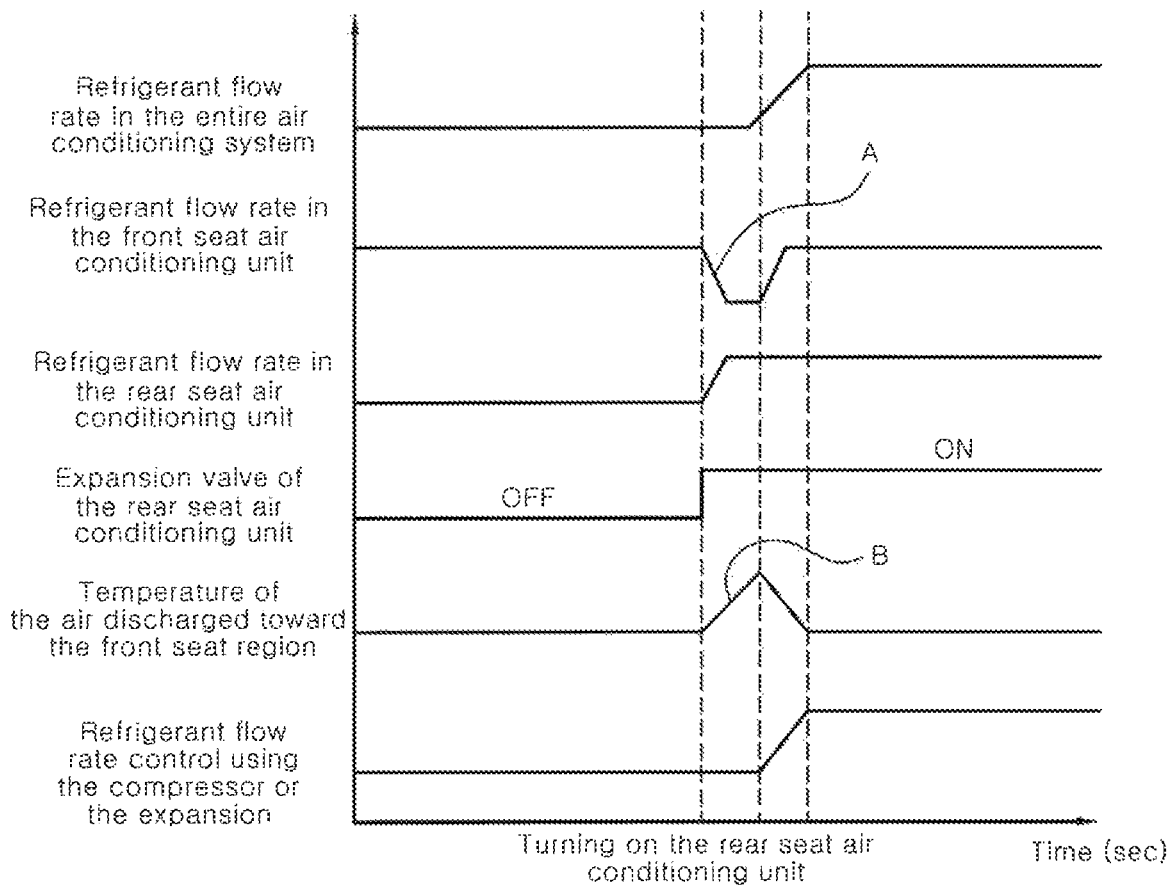
Figure 4:
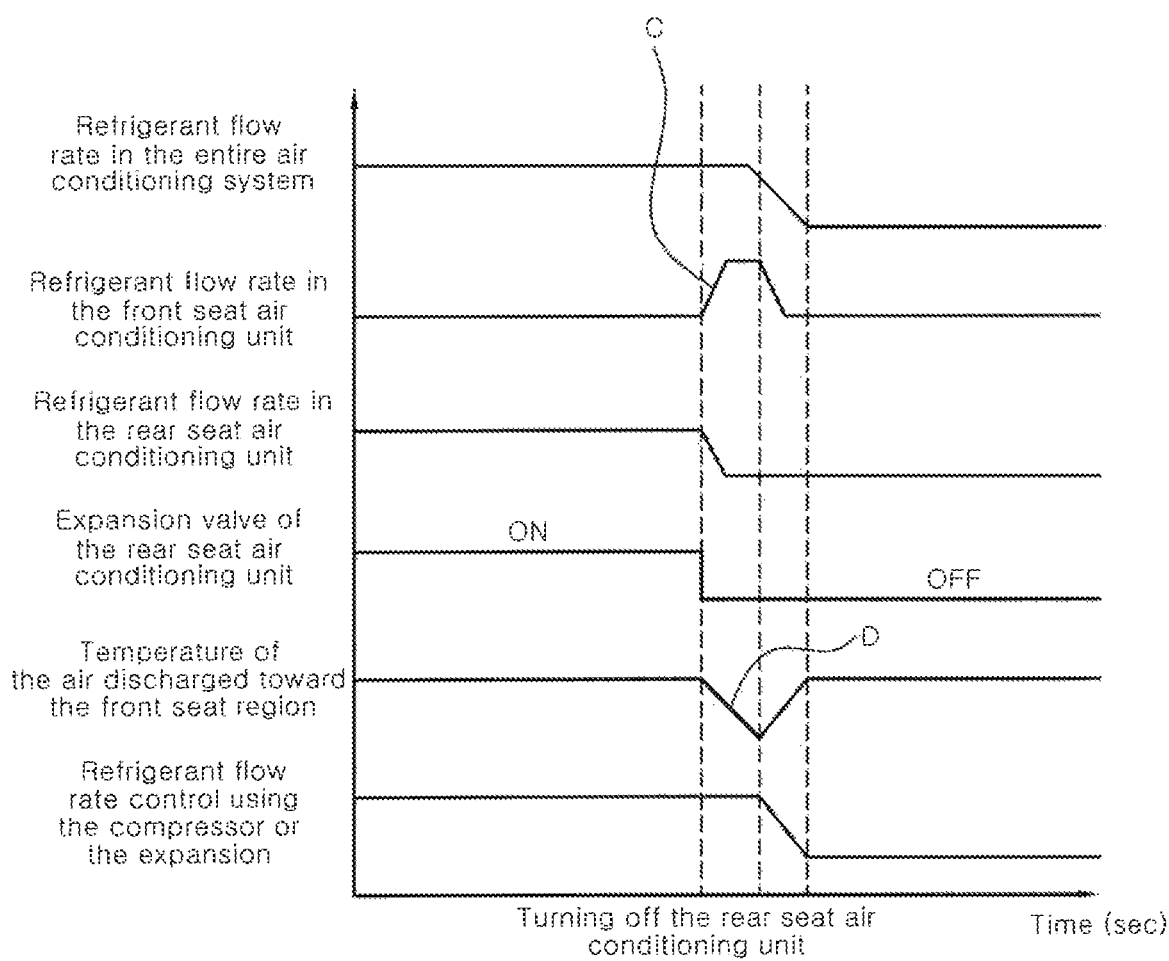

Preferred embodiments of an air conditioning system for motor vehicles according to the present invention will now be described in detail with reference to the accompanying drawings. Components similar to those of the related art described earlier will be designated by like reference symbols.

First Embodiment

First, a multi-zone type air conditioning system will be briefly described with reference to FIG. 5 prior to describing features of the air conditioning system for motor vehicles according to the present invention.

The multi-zone type air conditioning system includes a compressor 10, a condenser 12, a front seat air conditioning unit 20, a rear seat air conditioning unit 30 and a battery air conditioning unit 40. The front seat air conditioning unit 20, the rear seat air conditioning unit 30 and the battery air conditioning unit 40 are installed in parallel with each other with respect to the compressor 10 and the condenser 12.

The front seat air conditioning unit 20 is provided for cooling a front seat region in a passenger compartment, and includes an expansion valve 22, an evaporator 24 and a blower 26 for blowing a cold air of the evaporator 24 to the front seat region in the passenger compartment.

The rear seat air conditioning unit 30 is provided for cooling a rear seat region in a passenger compartment, and includes an expansion valve 32, an evaporator 34 and a blower 36 for blowing a cold air of the evaporator 34 to the rear seat region in the passenger compartment.

The battery air conditioning unit 40 is used for cooling a battery (not shown), and includes an expansion valve 42 and an evaporator 44.

Next, the features of the air conditioning system for motor vehicles according to the present invention will be described in detail with, reference to FIGS. 5 to 7.

Figure 5:
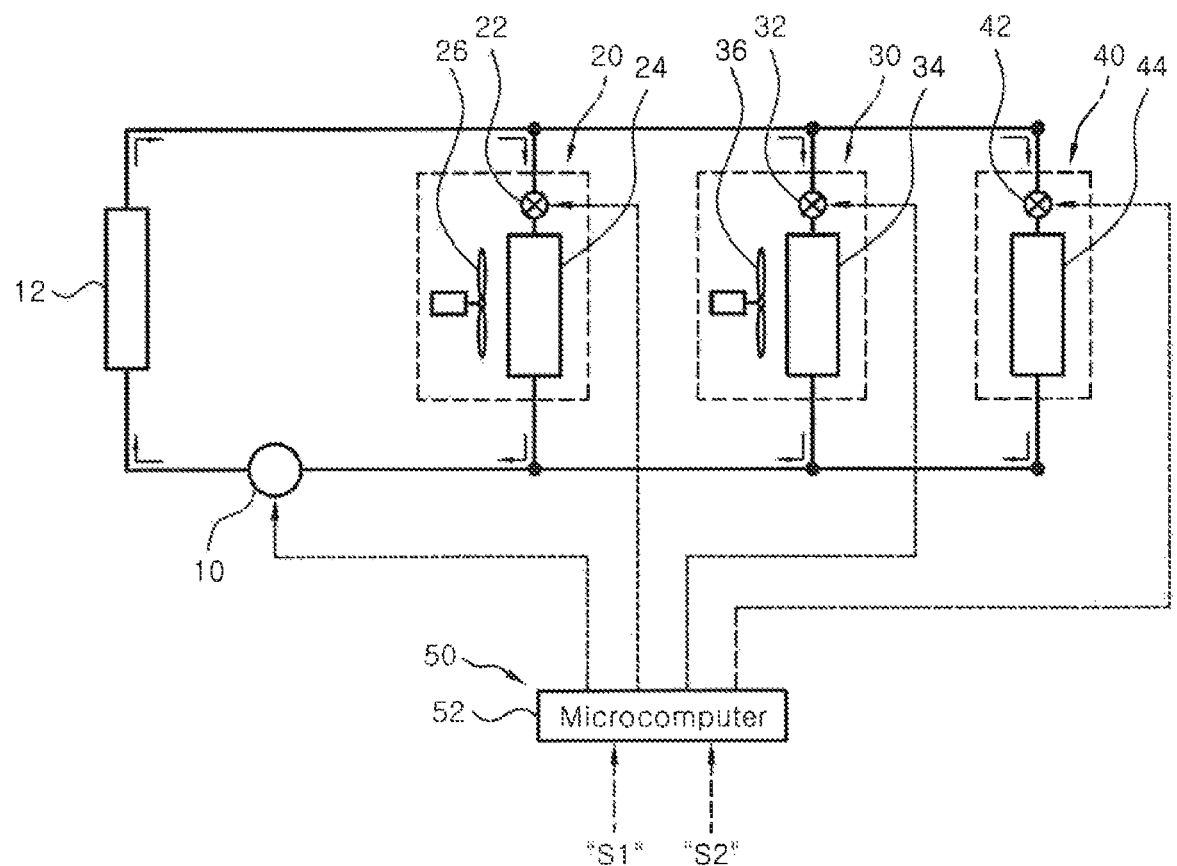
FIG. 5 is a view showing an air conditioning system for motor vehicles according to a first embodiment of the present invention.

Referring first to FIG. 5, the air conditioning system according to the present invention includes a flow rate control unit 50 configured to, when a specific one of the front seat air conditioning unit 20, the rear seat air conditioning unit 30 and the battery air conditioning unit 40 is additionally turned on or turned off, prevent a sudden change in refrigerant flow rate in the remaining air conditioning units.

The flow rate control unit 50 includes a microcomputer 52. The microcomputer 52 is provided with a microprocessor. The microcomputer 52 determines whether an on-signal S1 for turning on the remaining air conditioning units not in operation is inputted by a user or automatically in a state in which one or more of the front seat air conditioning unit 20, the rear seat air conditioning unit 30 and the battery air conditioning unit 40 are operated (turned on).

For example, the microcomputer 52 determines whether an on-signal S1 for turning on at least one of the rear seat air conditioning unit 30 and the battery air conditioning unit 40 is inputted by a user or automatically in a state in which the front seat air conditioning unit 20 is turned on.

Figure 6:
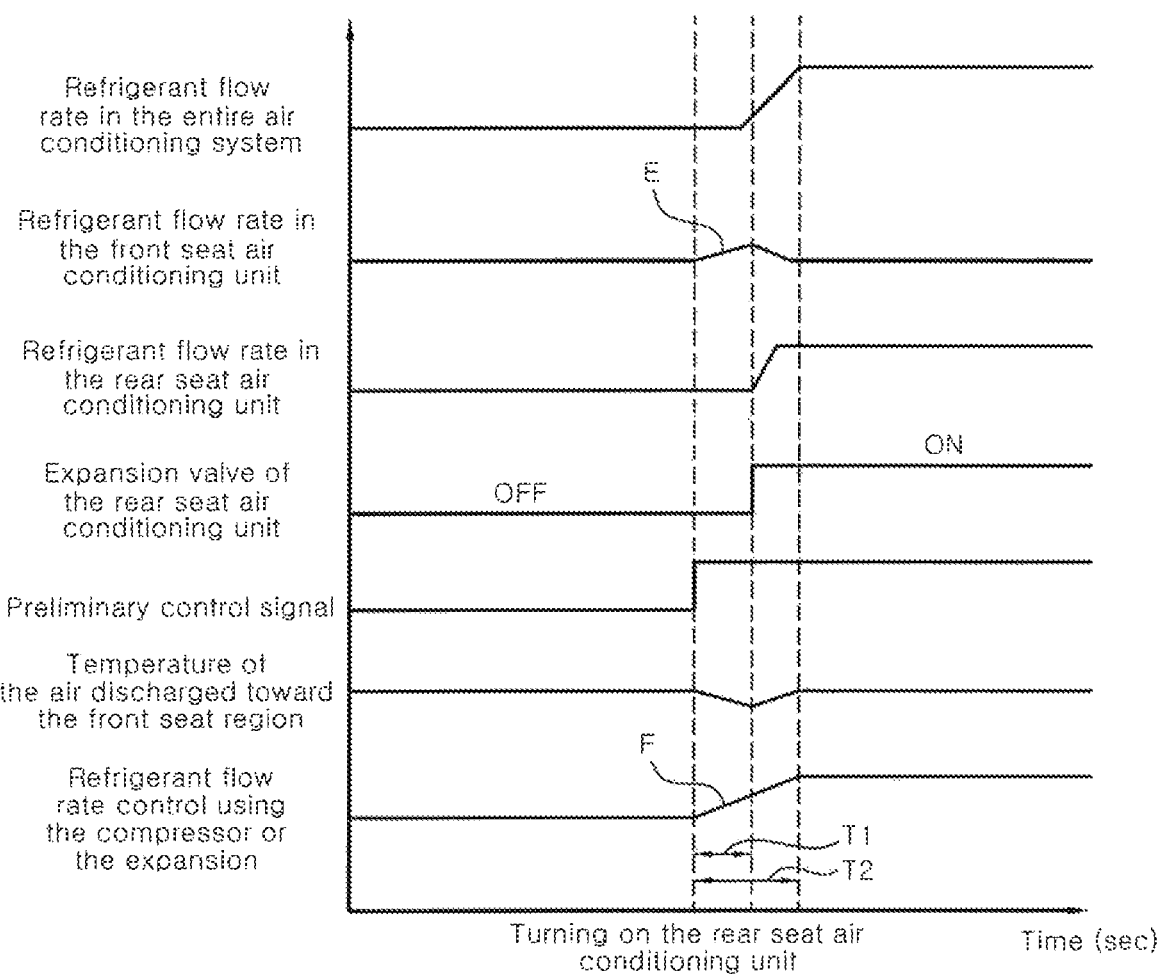

If it is determined that the on-signal S1 for turning on at least one of the rear seat air conditioning unit 30 and the battery air conditioning unit 40 is inputted, for example, if the on-signal S1 for turning on the rear seat air conditioning unit 30 is inputted, the microcomputer 52 does not immediately turn on the expansion valve 32 of the rear seat air conditioning unit 30 but outputs a preliminary control signal as shown in FIG. 6.

After outputting the preliminary control signal, the microcomputer 52 controls the compressor 10 or the expansion valve 22 to primarily increase an amount of a refrigerant supplied toward the front seat air conditioning unit 20 (as indicated by E).

At this time, when the expansion valve 22 is of an electromagnetic type, the amount of the refrigerant is increased by increasing an opening degree of a throttling flow path of the expansion valve 22. When the expansion valve 22 is of a temperature sensing type, the amount of the refrigerant is increased by controlling the compressor 10.

In particular, in the case of a fixed capacity type compressor 10, the amount of the refrigerant passing through the compressor 10 is increased by increasing the rotation speed of the compressor 10. In the case of a swash plate variable capacity type compressor 10, the amount of the refrigerant passing through the compressor 10 is increased by controlling an angle of a swash plate.

The microcomputer 52 is configured to turn on the expansion valve 32 of the rear seat air conditioning unit 30 when a specified time T1 elapses after increasing the amount of the refrigerant in the front seat air conditioning unit 20.

Thus, the rear seat air conditioning unit 30 is operated to cool the rear seat region in the passenger compartment.

With such a configuration, when the rear seat air conditioning unit 30 is additionally operated (turned on) in a state in which the front seat air conditioning unit 20 is operated (turned on), the amount of the refrigerant in the front seat air conditioning unit 20 is increased in advance without immediately operating the rear seat air conditioning unit 30.

This makes it possible to prepare for a decrease in refrigerant amount on the side of the front seat air conditioning unit 20, which may occur as the rear seat air conditioning unit 30 is additionally operated (turned on).

By increasing the amount of the refrigerant supplied to the front seat air conditioning unit 20 prior to operating the rear seat air conditioning unit 30, it is possible to sufficiently compensate for a decrease in refrigerant amount on the side of the front seat air conditioning unit 20, which may occur as the rear seat air conditioning unit 30 is operated (turned on).

This makes it possible to prevent a decrease in refrigerant amount on the side of the front seat air conditioning unit 20, which may occur as the rear seat air conditioning unit 30 is operated (turned on). As a result, it is possible to prevent a decrease in cooling performance of the front seat air conditioning unit 20 due to the decrease in refrigerant amount and to prevent a sudden increase in temperature of an air discharged toward the front seat region.

The microcomputer 52 is configured to variably control a refrigerant increasing amount when increasing the amount of the refrigerant in the front seat air conditioning unit 20 as the rear seat air conditioning unit 30 is additionally operated (turned on). Specifically, the microcomputer 52 is configured to variably control the refrigerant increasing amount depending on a cooling load in the rear seat air conditioning unit 30.

For example, if the cooling load in the rear seat air conditioning unit 30 is large, the refrigerant increasing amount on the side of the front seat air conditioning unit 20 is increased in proportion to the cooling load. If the cooling load in the rear seat air conditioning unit 30 is small, the refrigerant increasing amount on the side of the front seat air conditioning unit 20 is decreased in proportion to the cooling load.

The reason for adopting such a configuration is that the refrigerant decreasing amount in the front seat air conditioning unit 20 varies depending on the cooling load in the rear seat air conditioning unit 30. This makes it possible to actively cope with the refrigerant decreasing amount in the front seat air conditioning unit 20, which varies depending on the cooling load in the rear seat air conditioning unit 30.

In general, the cooling load in the rear seat air conditioning unit 30 may be calculated based on the target air volume of the blower 36 of the rear seat air conditioning unit 30 and the upstream/downstream temperature difference of the evaporator 34 of the rear seat air conditioning unit 30. The microcomputer 52 is configured to calculate the cooling load in the rear seat air conditioning unit 30 in view of the target air volume of the blower 36 of the rear seat air conditioning unit 30 and the upstream/downstream temperature difference of the evaporator 34 of the rear seat air conditioning unit 30, and to variably control the refrigerant increasing amount in the front seat air conditioning unit 20 depending on the calculated cooling load in the rear seat air conditioning unit 30.

The microcomputer 52 pre-stores a table in which refrigerant increasing amounts are associated with cooling loads in the rear seat air conditioning unit 30.

In the present embodiment, description has been made on an example in which the rear seat air conditioning unit 30 is additionally operated (turned on) during the operation of the front seat air conditioning unit 20. In some cases, however, the battery air conditioning unit 40 may be additionally operated (turned on) during the operation of the front seat air conditioning unit 20, or the rear seat air conditioning unit 30 and the battery air conditioning unit 40 may be operated (turned on) during the operation of the front seat air conditioning unit 20.

When the battery air conditioning unit 40 is additionally operated (turned on) during the operation of the front seat air conditioning unit 20, the microcomputer 52 increases in advance the amount of the refrigerant in the front seat air conditioning unit 20 and variably controls the refrigerant increasing amount depending on the cooling load in the battery air conditioning unit 40.

For example, if the cooling load in the battery air conditioning unit 40 is large, the refrigerant increasing amount in the front seat air conditioning unit 20 is increased in proportion to the cooling load. If the cooling load in the battery air conditioning unit 40 is small, the refrigerant increasing amount in the front seat air conditioning unit 20 is decreased in proportion to the cooling load.

In general, the cooling load in the battery air conditioning unit 40 may be calculated based on a temperature difference between a current temperature of the battery and a target temperature of the battery. The microcomputer 52 is configured to calculate the cooling load in the battery air conditioning unit 40 based on the temperature difference between the current temperature of the battery and the target temperature of the battery and then to variably control the refrigerant increasing amount in the front seat air conditioning unit 20 depending on the calculated cooling load in the battery air conditioning unit 40.

The microcomputer 52 pre-stores a table in which refrigerant increasing amounts are associated with the cooling loads in the battery air conditioning unit 40.

On the other hand, when the rear seat air conditioning unit 30 and the battery air conditioning unit 40 are operated (turned on) during the operation of the front seat air conditioning unit 20, the microcomputer 52 increases the refrigerant amount in the front seat air conditioning unit 20 and variably controls the refrigerant increasing amount in view of the cooling load in the rear seat air conditioning unit 30 and the cooling load in the battery air conditioning unit 40.

Preferably, when the rear seat air conditioning unit 30 and the battery air conditioning unit 40 are operated (turned on) during the operation of the front seat air conditioning unit 20, the microcomputer 52 adds up the refrigerant increasing amount for the cooling load in the front seat air conditioning unit 20 and the refrigerant increasing amount for the cooling load in the battery air conditioning unit 40, and increases the refrigerant amount in the front seat air conditioning unit 20 based on the added refrigerant increasing amount.

Referring again to FIGS. 5 and 6, when at least one of the rear seat air conditioning unit 30 and the battery air conditioning unit 40 is additionally operated during the operation of the front seat air conditioning unit 20, the microcomputer 52 linearly increases the refrigerant amount in the front seat air conditioning unit 20 in advance. To this end, the microcomputer 52 linearly controls the compressor 10 or the expansion valve 22 (as indicated by F in FIG. 6).

The reason for adopting such a configuration is to prevent a sudden increase in refrigerant amount in the front seat air conditioning unit 20. This makes it possible to prevent a sudden change in cooling performance of the front seat air conditioning unit 20 due to the sudden increase in refrigerant amount.

When at least one of the rear seat air conditioning unit 30 and the battery air conditioning unit 40, for example, the rear seat air conditioning unit 30, is additionally operated during the operation of the front seat air conditioning unit 20, the microcomputer 52 linearly controls the compressor 10 or the expansion valve 22 (as indicated by F) so that the control time T2 extends beyond the turned-on time of the rear seat air conditioning unit 30 as shown in FIG. 6.

When at least one of the rear seat air conditioning unit 30 and the battery air conditioning unit 40 is additionally operated during the operation of the front seat air conditioning unit 20, the microcomputer 52 linearly controls the compressor 10 or the expansion valve 22 (as indicated by F) so that the control time T2 becomes variable. Specifically, the microcomputer 52 variably controls the control time T2 depending on the refrigerant increasing amount in the front seat air conditioning unit 20.

For example, the microcomputer 52 controls the control time T2 such that the control time T2 proportionally increases as the refrigerant increasing amount in the front seat air conditioning unit 20 grows larger and such that the control time T2 proportionally decreases as the refrigerant increasing amount in the front seat air conditioning unit 20 grows smaller.

With such a configuration, by variably controlling the control time T2 of the compressor 10 or the expansion valve 22 in proportion to the refrigerant increasing amount in the front seat air conditioning unit 20, it is possible to make sure that the inclination of the control time T2 becomes smaller as the refrigerant increasing amount in the front seat air conditioning unit 20 grows larger.

Thus, it is possible to suppress a sudden increase in refrigerant amount on the side of the front seat air conditioning unit 20. As a result, it is possible to suppress a sudden change in cooling performance of the front seat air conditioning unit 20 due to the sudden increase in refrigerant amount.

The microcomputer 52 pre-stores a table in which different kinds of control time T2 are associated with the refrigerant increasing amounts in the front seat air conditioning unit 20.

Referring again to FIGS. 5 and 6, when at least one of the rear seat air conditioning unit 30 and the battery air conditioning unit 40, for example, the rear seat air conditioning unit 30, is additionally operated during the operation of the front seat air conditioning unit 20, the microcomputer 52 increases the refrigerant amount in the front seat air conditioning unit 20 in advance and turns on the rear seat air conditioning unit 30 after a specified time T1 elapses. The specified time T1 is variable.

In particular, the specified time T1 is variable according to the control time T2 of the compressor 10 or the expansion valve 22.

For example, the specified time T1 for turning on the rear seat air conditioning unit 30 is made longer as the control time T2 of the compressor 10 or the expansion valve 22 becomes longer. The specified time T1 for turning on the rear seat air conditioning unit 30 is made shorter as the control time T2 of the compressor 10 or the expansion valve 22 becomes shorter.

With such a configuration, by making sure that the specified time T1 for turning on the rear seat air conditioning unit 30 is made longer as the control time T2 of the compressor 10 or the expansion valve 22 becomes longer, it is possible to ensure that a sufficient amount of refrigerant is supplied to the front seat air conditioning unit 20 before the rear seat air conditioning unit 30 is turned on.

Referring again to FIG. 5, the microcomputer 52 determines whether an off-signal S2 for one of the front seat air conditioning unit 20, the rear seat air conditioning unit 30 and the battery air conditioning unit 40 is inputted by a user or automatically in a state in which at least two of the front seat air conditioning unit 20, the rear seat air conditioning unit 30 and the battery air conditioning unit 40 are in operation.

For example, the microcomputer 52 determines whether an off-signal S2 for the rear seat air conditioning unit 30 is inputted by a user or automatically in a state in which the front seat air conditioning unit 20 and the rear seat air conditioning unit 30 are in operation.

Figure 7:
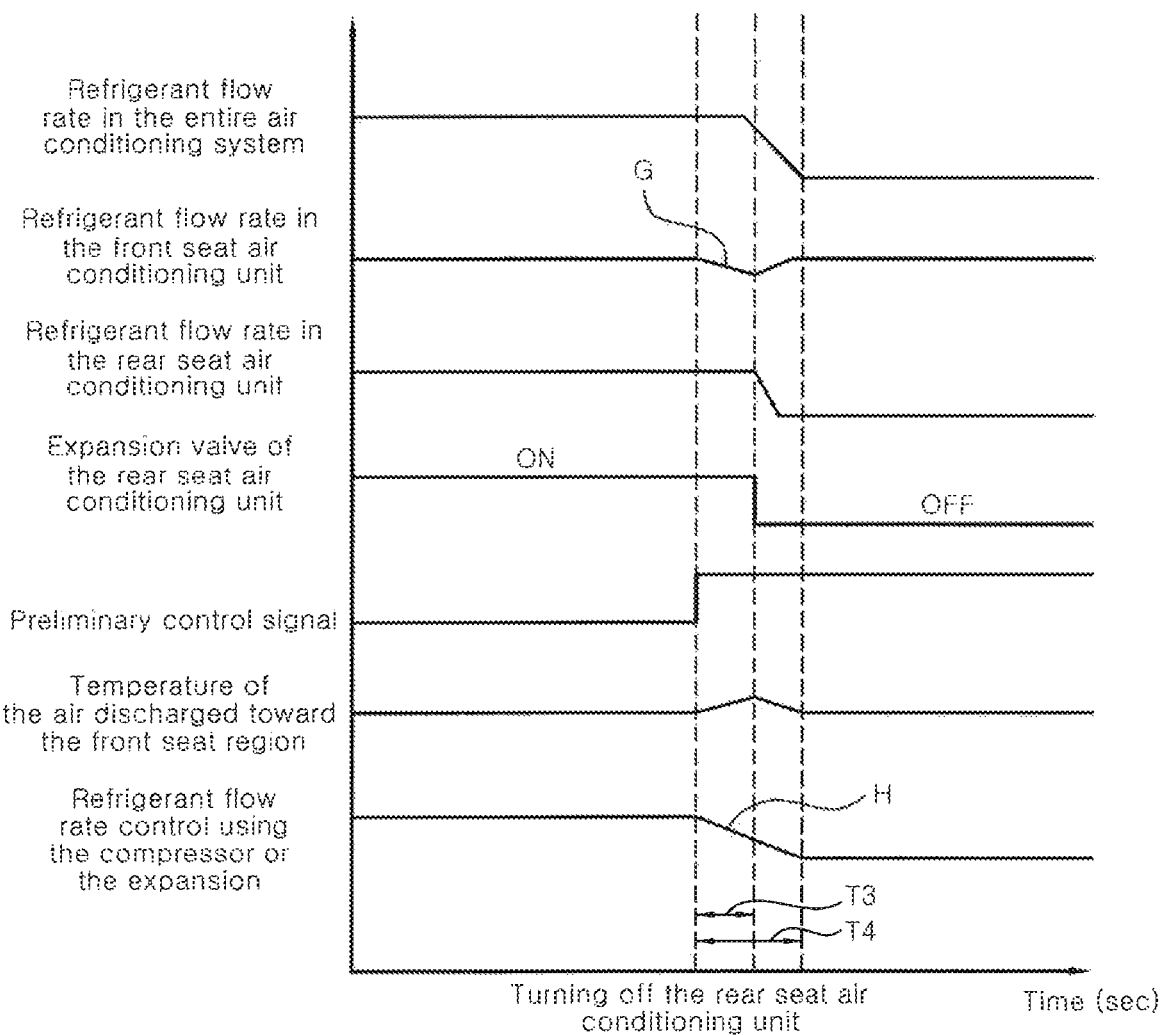

If it is determined that the off-signal S2 for the rear seat air conditioning unit 30 is inputted, as shown in FIG. 7, the microcomputer 52 outputs a preliminary control signal without immediately turning off the expansion valve 32 of the rear seat air conditioning unit 30.

After outputting the preliminary control signal, the microcomputer 52 controls the compressor 10 or the expansion valve 22 so primarily reduce the amount of the refrigerant supplied toward the front seat air conditioning unit 20.

At this time, when the expansion valve 22 is of an electromagnetic type, the amount of the refrigerant is reduced by reducing an opening degree of a throttling flow path of the expansion valve 22. When the expansion valve 22 is of a temperature sensing type, the amount of the refrigerant is reduced by controlling the compressor 10.

In particular, in the case of a fixed capacity type compressor 10, the amount of the refrigerant passing through the compressor 10 is reduced by reducing the rotation speed of the compressor 10. In the case of a swash plate variable capacity type compressor 10, the amount of the refrigerant passing through the compressor 10 is reduced by controlling an angle of a swash plate.

The micro-computer 52 is configured to turn off the expansion valve 32 of the rear seat air conditioning unit 30 when a specified time T3 elapses in a state in which the refrigerant amount in the front seat air conditioning unit 20 is first reduced.

Thus, the rear seat air conditioning unit 30 is turned off to stop the cooling of the rear seat region.

With such a configuration, when the rear seat air conditioning unit 30 is turned off in a state in which the front seat air conditioning unit 20 and the rear seat air conditioning unit 30 are operated (turned on), the refrigerant amount in the front seat air conditioning unit 20 is reduced, in advance without immediately turning off the rear seat air conditioning unit 30.

Accordingly, it is possible to prepare for the increase in refrigerant amount on the side of the front seat air conditioning unit 20, which may occur as the rear seat air conditioning unit 30 is turned off.

In particular, by reducing in advance the refrigerant amount supplied to the front seat air conditioning unit 20 before operating the rear seat air conditioning unit 30, it is possible to compensate for the increase in refrigerant amount on the side of the front seat air conditioning unit 20, which may occur at the time of turning off the rear seat air conditioning unit 30.

Thus, it is possible to prevent the increase in refrigerant amount on the side of the front seat air conditioning unit 20, which may occur as the rear seat air conditioning unit 30 is turned off. As a result, it is possible to prevent a sudden change in cooling performance of the front seat air conditioning unit 20 due to the increase in refrigerant amount and to prevent a sudden decrease in temperature of an air discharged toward the front seat region.

The microcomputer 52 is configured to reduce in advance the refrigerant amount in the front seat air conditioning unit 20 when turning off the rear seat air conditioning unit 30 and to variably control the refrigerant reduction amount. Specifically, the microcomputer 52 is configured to variably control the refrigerant reduction amount depending on the cooling load in the rear seat air conditioning unit 30.

For example, if the cooling load in the rear seat air conditioning unit 30 is large, the refrigerant reduction amount on the side of the front seat air conditioning unit 20 is increased in proportion to the cooling load. If the cooling load in the rear seat air conditioning unit 30 is small, the refrigerant reduction amount on the side of the front seat air conditioning unit 20 is reduced in proportion to the cooling load.

The reason for adopting such a configuration is that the refrigerant increasing amount in the front seat air conditioning unit 20 varies depending on the cooling load in the rear seat air conditioning unit 30. Thus, it is possible to actively cope with the refrigerant increasing amount in the front seat air conditioning unit 20, which varies depending on the cooling load in the rear seat air conditioning unit 30.

As described above, the cooling load in the rear seat air conditioning unit 30 may be calculated based on the target air volume of the blower 36 of the rear seat air conditioning unit 30 and the upstream/downstream temperature difference of the evaporator 34 of the rear seat air conditioning unit 30. The microcomputer 52 is configured to calculate the cooling load in the rear seat air conditioning unit 30 in view of the target air volume of the blower 36 of the rear seat air conditioning unit 30 and the upstream/downstream temperature difference of the evaporator 34 of the rear seat air conditioning unit 30, and then to variably control the refrigerant reduction amount in the front seat air conditioning unit 20 depending on the calculated cooling load in the rear seat air conditioning unit 30.

The microcomputer 52 pre-stores a table in which refrigerant reduction amounts are associated with cooling loads in the rear seat air conditioning unit 30.

In the present embodiment, description has been made on an example in which the rear seat air conditioning unit 30 is turned off during the operation of the front seat air conditioning unit 20 and the rear seat air conditioning unit 30. In some cases, however, the battery air conditioning unit 40 may be turned off during the operation of the front seat air conditioning unit 20 and the battery air conditioning unit 40, or the rear seat air conditioning unit 30 and the battery air conditioning unit 40 may be turned off during the operation of the front seat air conditioning unit 20, the rear seat air conditioning unit 30 and the battery air conditioning unit 40.

At this time, when the battery air conditioning unit 40 is turned off during the operation of the front seat air conditioning unit 20 and the battery air conditioning unit 40, the microcomputer 52 reduces in advance the amount of the refrigerant in the front seat air conditioning unit 20 and variably controls the refrigerant reduction amount depending on the cooling load in the battery air conditioning unit 40.

For example, if the cooling load in the battery air conditioning unit 40 is large, the refrigerant reduction amount in the front seat air conditioning unit 20 is increased in proportion to the cooling load. If the cooling load in the battery air conditioning unit 40 is small, the refrigerant reduction amount in the front seat air conditioning unit 20 is decreased in proportion to the cooling load.

The cooling load in the battery air conditioning unit 40 may be calculated based on a temperature difference between a current temperature of the battery and a target temperature of the battery. The microcomputer 52 is configured to calculate the cooling load in the battery air conditioning unit 40 based on the temperature difference between the current temperature of the battery and the target temperature of the battery and then to variably control the refrigerant reduction amount in the front seat air conditioning unit 20 depending on the calculated cooling load in the battery air conditioning unit 40.

The microcomputer 52 pre-stores a table in which refrigerant reduction amounts are associated with the cooling loads in the battery air conditioning unit 40.

On the other hand, when the rear seat air conditioning unit 30 and the battery air conditioning unit 40 are turned off during the operation of the front seat air conditioning unit 20, the rear seat air conditioning unit 30 and the battery air conditioning unit 40, the microcomputer 52 reduces in advance the refrigerant amount in the front seat air conditioning unit 20 and variably controls the refrigerant reduction amount in view of the cooling load in the rear seat air conditioning unit 30 and the cooling load in the battery air conditioning unit 40.

Preferably, when the rear seat air conditioning unit 30 and the battery air conditioning unit 40 are turned off during the operation of the front seat air conditioning unit 20, the rear seat air conditioning unit 30 and the battery air conditioning unit 40, the microcomputer 52 adds up the refrigerant reduction amount for the cooling load in the front seat air conditioning unit 20 and the refrigerant reduction amount for the cooling load in the battery air conditioning unit 40, and reduces the refrigerant amount in the front seat air conditioning unit 20 based on the added refrigerant reduction amount.

Referring again to FIGS. 5 to 7, when the battery air conditioning unit 40 is turned off during the operation of the front seat air conditioning unit 20 and the battery air conditioning unit 40, the microcomputer 52 linearly reduces the refrigerant amount in the front seat air conditioning unit 20 in advance. To this end, the microcomputer 52 linearly controls the compressor 10 or the expansion valve 22 (as indicated by H).

The reason for adopting such a configuration is to prevent a sudden reduction in refrigerant amount in the front seat air conditioning unit 20. This makes it possible to prevent a sudden change in cooling performance of the front seat air conditioning unit 20 due to the sudden reduction in refrigerant amount.

When the battery air conditioning unit 40 is turned off during the operation of the front seat air conditioning unit 20 and the battery air conditioning unit 40, the microcomputer 52 linearly controls the compressor 10 or the expansion valve 22 (as indicated by H) so that the control time T4 extends beyond the turned-off time of the rear seat air conditioning unit 30 as shown in FIG. 7.

When the battery air conditioning unit 40 is turned off during the operation of the front seat air conditioning unit 20 and the battery air conditioning unit 40, the microcomputer 52 linearly controls the compressor 10 or the expansion valve 22 (as indicated by R) so that the control time T4 becomes variable. Specifically, the microcomputer 52 variably controls the control time T4 depending on the refrigerant reduction amount in the front seat air conditioning unit 20.

For example, the microcomputer 52 controls the control time T4 such that the control time T4 proportionally increases as the refrigerant reduction amount in the front seat air conditioning unit 20 grows larger and such that the control time T4 proportionally decreases as the refrigerant reduction amount in the front seat air conditioning unit 20 grows smaller.

With such a configuration, by variably controlling the control time T4 of the compressor 10 or the expansion valve 22 in proportion to the refrigerant reduction amount in the front seat air conditioning unit 20, it is possible to make sure that the inclination of the control time T4 becomes smaller as the refrigerant reduction amount in the front seat air conditioning unit 20 grows larger.

Thus, it is possible to suppress a sudden reduction in refrigerant amount on the side of the front seat air conditioning unit 20. As a result, it is possible to suppress a sudden change in cooling performance of the front seat air conditioning unit 20 due to the sudden reduction in refrigerant amount.

The microcomputer 52 pre-stores a table in which different kinds of control time T4 are associated with the refrigerant reduction amounts in the front seat air conditioning unit 20.

Referring again to FIGS. 5 and 7, when the battery air conditioning unit 40 is turned off during the operation of the front seat air conditioning unit 20 and the battery air conditioning unit 40, the microcomputer 52 reduces in advance the refrigerant amount in the front seat air conditioning unit 20 and then turns off the rear seat air conditioning unit 30 after a specified time T3 elapses. The specified time T3 is variable.

In particular, the specified time T3 is variable according to the control time T4 of the compressor 10 or the expansion valve 22.

For example, the specified time T3 for turning off the rear seat air conditioning unit 30 is made longer as the control time T4 of the compressor 10 or the expansion valve 22 becomes longer. The specified time T3 for turning off the rear seat air conditioning unit 30 is made shorter as the control time T4 of the compressor 10 or the expansion valve 22 becomes shorter.

With such a configuration, by making sure that the specified time T3 for turning off the rear seat air conditioning unit 30 is made longer as the control time T4 of the compressor 10 or the expansion valve 22 becomes longer, it is possible to ensure that the refrigerant amount in the front seat air conditioning unit 20 is sufficiently reduced before the rear seat air conditioning unit 30 is turned off.

Second Embodiment

Figure 8:
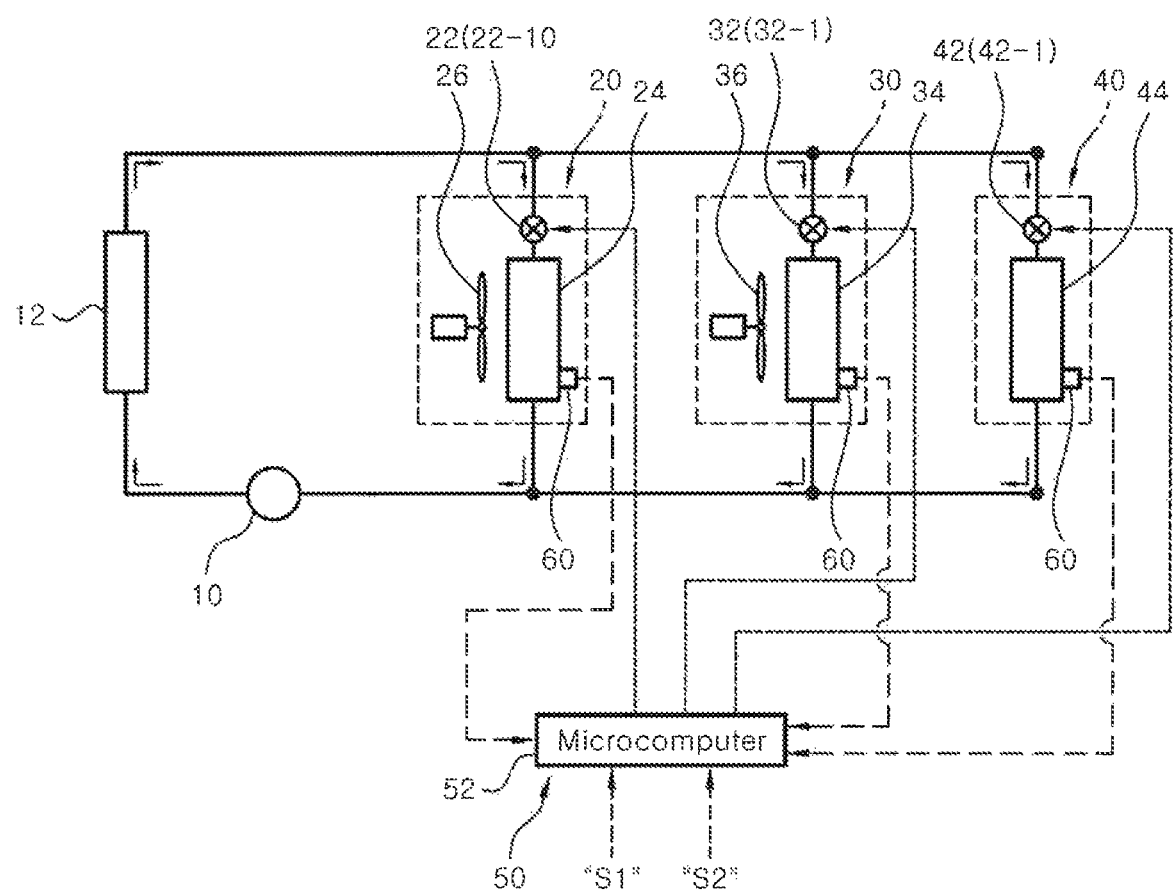
FIG. 8 is a view showing an air conditioning system for motor vehicles according to a second embodiment of the present invention.

Next, the air conditioning system for motor vehicles according to a second embodiment of the present invention will be described with reference to FIG. 8.

The air conditioning system according to the second embodiment includes a control unit 50. The control unit 50 includes opening/closing valves 22-1, 32-1 and 42-1 integrally installed with the expansion valves 22, 32 and 42.

The opening/closing valves 22-1, 32-1 and 42-1 are installed on the upstream side of the expansion valves 22, 32 and 42. The opening/closing valves 22-1, 32-1 and 42-1 are on/off controlled in response to a control signal applied thereto, thereby cutting off or permitting a flow of a refrigerant to the expansion valves 22, 32 and 42.

If necessary, the opening/closing valves 22-1, 32-1 and 42-1 may be installed separately from the expansion valves 22, 32 and 42. In this case, the opening/closing valves 22-1, 32-1 and 42-1 are installed on the upstream side of the expansion valves 22, 32 and 42.

The microcomputer 52 determines whether an on-signal S1 for turning on the remaining air conditioning units not in operation is inputted by a user or automatically in a state in which one or more of the front seat air conditioning unit 20, the rear seat air conditioning unit 30 and the battery air conditioning unit 40 are operated (turned on).

For example, the microcomputer 52 determines whether an on-signal S1 for turning on at least one of the rear seat air conditioning unit 30 and the battery air conditioning unit 40 is inputted by a user or automatically in a state in which the front seat air conditioning unit 20 is turned on.

Figure 9:
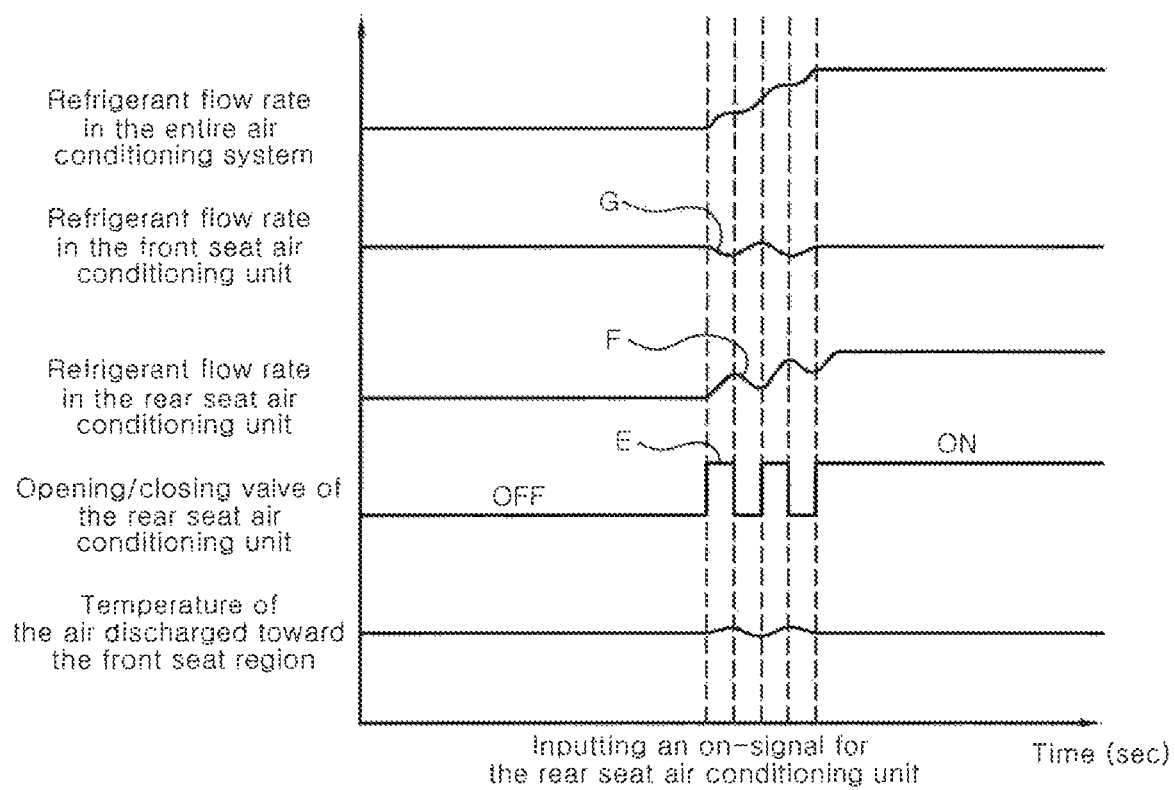

If it is determined that the on-signal S1 for turning on at least one of the rear seat air conditioning unit 30 and the battery air conditioning unit 40 is inputted, for example, the on-signal S1 for turning on the rear seat air conditioning unit 30 is inputted, as shown in FIG. 9, the microcomputer 52 repeatedly turns on and off the opening/closing valve 32-1 on the side of the expansion valve 32 of the rear seat air conditioning unit 30 and then turns on the opening/closing valve 32-1 without immediately turning on the opening/closing valve 32-1.

Specifically, the opening/closing valve 32-1 on the side of the expansion valve 32 of the rear seat air conditioning unit 30 is repeatedly turned on and off a predetermined number of times at a predetermined time interval from the time at which the on-signal S1 for turning on the rear seat air conditioning unit 30 is inputted, and is then finally turned on. For example, the opening/closing valve 32-1 is repeatedly turned on and off at a time interval of 5 seconds and is finally turned on for the third time.

Accordingly, when the rear seat air conditioning unit 30 is turned on, the flow rate of the refrigerant supplied to the rear seat air conditioning unit 30 is gradually increased (as indicated by F). This makes it possible to prevent a large amount of refrigerant from being suddenly supplied toward the rear seat air conditioning unit 30 when the rear seat air conditioning unit 30 is turned on.

As a result, it is possible to prevent a sudden decrease in refrigerant amount on the side of the front seat air conditioning unit 20, which may occur when the rear seat air conditioning unit 30 is additionally operated (turned on) (as indicated by G).

This makes it possible to prevent a decrease in cooling performance of the front seat air conditioning unit 20 due to the decrease in refrigerant amount and to prevent a sudden increase in temperature of an air discharged toward the front seat region.

When the rear seat air conditioning unit 30 is additionally operated (turned on), the microcomputer 52 repeatedly turns on and off the opening/closing valve 32-1 of the rear seat air conditioning unit 30. If necessary, the microcomputer 52 may repeatedly turn on and off the opening/closing valve 32-1 for a predetermined time at a predetermined time interval and then may finally turn on the opening/closing valve 32-1.

The microcomputer 52 is configured to repeatedly turn on and off the opening/closing valve 32-1 of the rear seat air conditioning unit 30 only when a temperature increment in the evaporator 24 of the front seat air conditioning unit 20 when turning on the rear seat air conditioning unit 30 is equal to or larger than a predetermined reference temperature increment, e.g., 5 degrees C.

That is to say, the microcomputer 52 turns on and off the opening/closing valve 32-1 of the rear seat air conditioning unit 30 when the rear seat air conditioning unit 30 is additionally operated (turned on). In the process of turning on the opening/closing valve 32-1 for a predetermined time, e.g., 5 seconds, the microcomputer 52 determines whether the temperature increment in the evaporator 24 of the front seat air conditioning unit 20 is equal to or larger than 5 degrees C.

If it is determined that the temperature increment in the evaporator 24 of the front seat air conditioning unit 20 is equal to or larger than 5 degrees C., the microcomputer 52 turns off the opening/closing valve 32-1 of the rear seat air conditioning unit 30 for a predetermined time, e.g., 5 seconds and then turns on the opening/closing valve 32-1.

After turning on the opening/closing valve 32-1 of the rear seat air conditioning unit 30 again, the microcomputer 52 determines for a predetermined time (5 seconds) whether the temperature increment in the evaporator 24 of the front seat air conditioning unit 20 is equal to or larger than 5 degrees C. Depending on the result of determination, the microcomputer 52 determines whether to turn off the opening/closing valve 32-1 of the rear seat air conditioning unit 30.

In other words, the microcomputer 52 allows the opening/closing valve 32-1 of the rear seat air conditioning unit 30 to be repeatedly turned on and off only when the temperature increment in the evaporator 24 of the front seat air conditioning unit 20 due to the additional operation of the rear seat air conditioning unit 30 is equal to or larger than the predetermined reference temperature increment.

The reason for determining whether to control the on/off operation of the opening/closing valve 32-1 of the rear seat air conditioning unit 30 depending on the temperature increment in the evaporator 24 of the front seat air conditioning unit 20 is that when the temperature increment in the evaporator 24 of the front seat air conditioning unit 20 is small, a sudden decrease in refrigerant amount on the side of the front seat air conditioning unit 20 does not occur even if the rear seat air conditioning unit 30 is additionally operated (turned on).

If it is determined that the temperature increment in the evaporator 24 of the front seat air conditioning unit 20 is smaller than 5 degrees C., the microcomputer 52 keeps the opening/closing valve 32-1 of the rear seat air conditioning unit 30 in a turned-on state without repeatedly turning on and off the opening/closing valve 32-1.

The microcomputer 52 is configured to, when additionally operating (turning on) the rear seat air conditioning unit 30, detect the temperature increment in the evaporator 24 of the front seat air conditioning unit 20 through the use of a temperature sensor 60 installed, on the side of the evaporator 24.

In the present embodiment, description has been made on an example in which the rear seat air conditioning unit 30 is additionally operated (turned on) during the operation of the front seat air conditioning unit 20. In some cases, however, the battery air conditioning unit 40 may be additionally operated (turned on) during the operation of the front seat air conditioning unit 20, or the rear seat air conditioning unit 30 and the battery air conditioning unit 40 may be operated (turned on) during the operation of the front seat air conditioning unit 20.

When the battery air conditioning unit 40 is additionally operated (turned on) during the operation of the front seat air conditioning unit 20, the microcomputer 52 determine whether to control the on/off operation of the opening/closing valve 42-1 of the battery air conditioning unit 40 depending on the temperature increment in the evaporator 24 of the front, seat air conditioning unit 20.

When the rear seat air conditioning unit 30 and the battery air conditioning unit 40 are operated during the operation of the front seat air conditioning unit 20, the microcomputer 52 determines whether to control the on/off operation of the opening/closing valve 32-1 of the rear seat air conditioning unit 30 and the opening/closing valve 42-1 of the battery air conditioning unit 40 depending on the temperature increment in the evaporator 24 of the front seat air conditioning unit 20.

Referring again to FIG. 8, the microcomputer 52 determines whether an off-signal S2 for turning off one air conditioning unit is inputted, by a user or automatically in a state in which two or more of the front seat air conditioning unit 20, the rear seat air conditioning unit 30 and the battery air conditioning unit 40 are operated.

For example, the microcomputer 52 determines whether an off-signal S2 for turning off the rear seat air conditioning unit 30 is inputted by a user or automatically in a state in which the front seat air conditioning unit 20 and the rear seat air conditioning unit 30 are operated.

Figure 10:
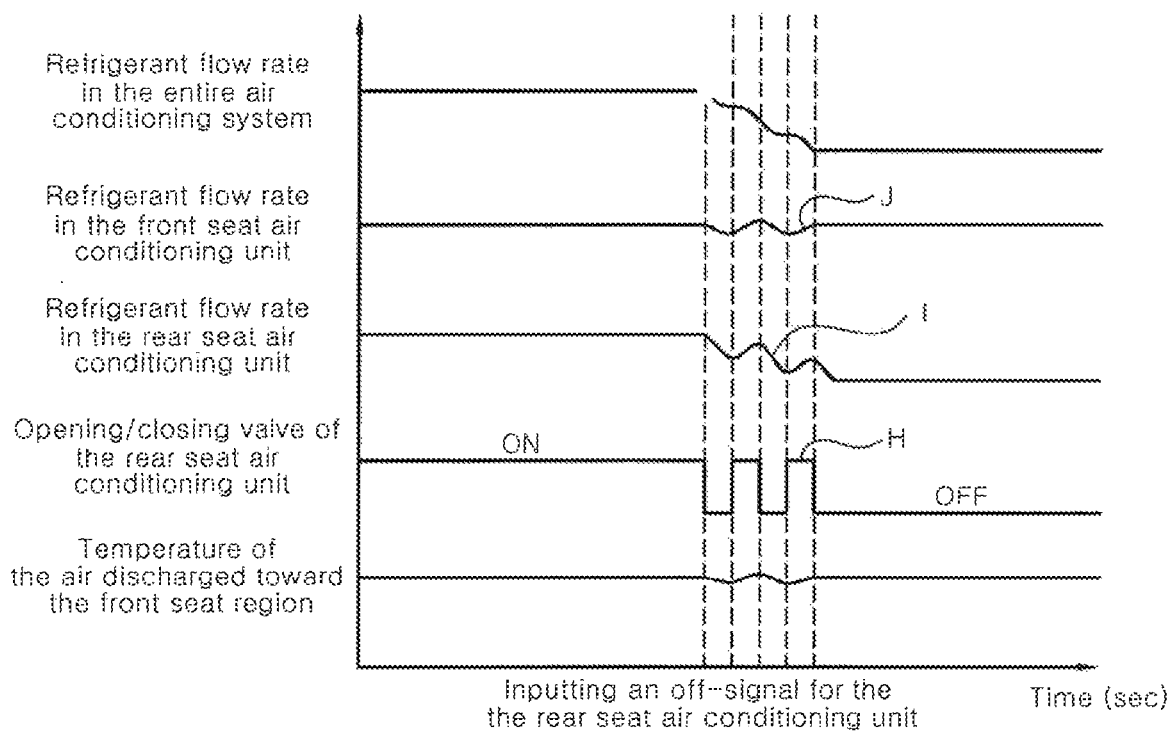

If it is determined that the off-signal S2 for turning off the rear seat air conditioning unit 30 is inputted, as shown in FIG. 10, the microcomputer 52 repeatedly turns off and on the opening/closing valve 32-1 of the rear seat air conditioning unit 30 and then turns off the opening/closing valve 32-1 without immediately turning off the opening/closing valve 32-1 (as indicated by H).

Specifically, the opening/closing valve 32-1 of the rear seat air conditioning unit 30 is repeatedly turned off and on a predetermined number of times at a predetermined time interval from the time at which the off-signal S2 for turning off the rear seat air conditioning unit 30 is inputted, and is then finally turned off. For example, the opening/closing valve 32-1 is repeatedly turned off and on at a time interval of 5 seconds and is finally turned off for the third time.

Accordingly, when the rear seat air conditioning unit 30 is turned off, the flow rate of the refrigerant supplied to the rear seat air conditioning unit 30 is gradually reduced (as indicated by I). This makes it possible to prevent a sudden stop of the supply of the refrigerant supplied toward the rear seat air conditioning unit 30 when the rear seat air conditioning unit 30 is turned off.

As a result, it is possible to prevent a sudden increase in refrigerant amount on the side of the front seat air conditioning unit 20, which may occur when the rear seat air conditioning unit 30 is turned off (as indicated by J).

This makes it possible to prevent an excessive increase in cooling performance of the front seat air conditioning unit 20 due to the increase in refrigerant amount and to prevent a sudden decrease in temperature of an air discharged toward the front seat region.

When the rear seat air conditioning unit 30 is turned off, the microcomputer 52 repeatedly turns off and on the opening/closing valve 32-1 of the rear seat air conditioning unit 30. If necessary, the microcomputer 52 may repeatedly turn off and on the opening/closing valve 32-1 for a predetermined time at a predetermined time interval and then may finally turn off the opening/closing valve 32-1.

The microcomputer 52 is configured to repeatedly turn off and on the opening/closing valve 32-1 of the rear seat air conditioning unit 30 only when a temperature decrement in the evaporator 24 of the front seat air conditioning unit 20 when turning off the rear seat air conditioning unit 30 is equal to or larger than a predetermined reference temperature decrement, e.g., 5 degrees C.

That is to say, the microcomputer 52 turns off and on the opening/closing valve 32-1 of the rear seat air conditioning unit 30 when the rear seat air conditioning unit 30 is turned off. In the process of turning off the opening/closing valve 32-1 for a predetermined time, e.g., 5 seconds, the microcomputer 52 determines whether the temperature decrement in the evaporator 24 of the front seat air conditioning unit 20 is equal to or larger than 5 degrees C.

If it is determined that the temperature decrement in the evaporator 24 of the front seat air conditioning unit 20 is equal to or larger than 5 degrees C., the microcomputer 52 turns on the opening/closing valve 32-1 of the rear seat air conditioning unit 30 for a predetermined time, e.g., 5 seconds and then turns off the opening/closing valve 32-1.

After turning off the opening/closing valve 32-1 of the rear seat air conditioning unit 30 again, the microcomputer 52 determines for a predetermined time (5 seconds) whether the temperature decrement in the evaporator 24 of the front seat air conditioning unit 20 is equal to or larger than 5 degrees C. Depending on the result of determination, the microcomputer 52 determines whether to turn on the opening/closing valve 32-1 of the rear seat air conditioning unit 30.

In other words, the microcomputer 52 allows the opening/closing valve 32-1 of the rear seat air conditioning unit 30 to be repeatedly turned off and on only when the temperature decrement in the evaporator 24 of the front seat air conditioning unit 20 due to the turning-off of the rear seat air conditioning unit 30 is equal to or larger than the predetermined reference temperature decrement.

The reason for determining whether to control the off/on operation of the opening/closing valve 32-1 of the rear seat air conditioning unit 30 depending on the temperature decrement in the evaporator 24 of the front seat air conditioning unit 20 is that when the temperature decrement in the evaporator 24 of the front seat air conditioning unit 20 is small, a sudden increase in refrigerant amount on the side of the front seat air conditioning unit 20 does not occur even if the rear seat air conditioning unit 30 is turned off.

If it is determined that the temperature decrement in the evaporator 24 of the front seat air conditioning unit 20 is smaller than 5 degrees C., the microcomputer 52 keeps the opening/closing valve 32-1 of the rear seat air conditioning unit 30 in a turned-off state without repeatedly turning off and on the opening/closing valve 32-1.

The microcomputer 52 is configured to, when turning off the rear seat air conditioning unit 30, detect the temperature decrement in the evaporator 24 of the front seat air conditioning unit 20 through the use of a temperature sensor 60 installed on the side of the evaporator 24.

In the present embodiment, description has been made on an example in which the rear seat air conditioning unit 30 is turned off during the operation of the front seat air conditioning unit 20. In some cases, however, the battery air conditioning unit 40 may be turned off during the operation of the front seat air conditioning unit 20, or the rear seat air conditioning unit 30 and the battery air conditioning unit 40 may be turned off during the operation of the front seat air conditioning unit 20.

When the battery air conditioning unit 40 is turned off during the operation of the front seat air conditioning unit 20, the microcomputer 52 determine whether to control the off/on operation of the opening/closing valve 42-1 of the battery air conditioning unit 40 depending on the temperature decrement in the evaporator 24 of the front seat air conditioning unit 20.

When the rear seat air conditioning unit 30 and the battery air conditioning unit 40 are turned off during the operation of the front seat air conditioning unit 20, the microcomputer 52 determines whether to control the off/on operation of the opening/closing valve 32-1 of the rear seat air conditioning unit 30 and the opening/closing valve 42-1 of the battery air conditioning unit 40 depending on the temperature decrement in the evaporator 24 of the front seat air conditioning unit 20.

Next, an operation example of the air conditioning system configured as above will be described with reference to FIGS. 8 to 12.

Figure 11:
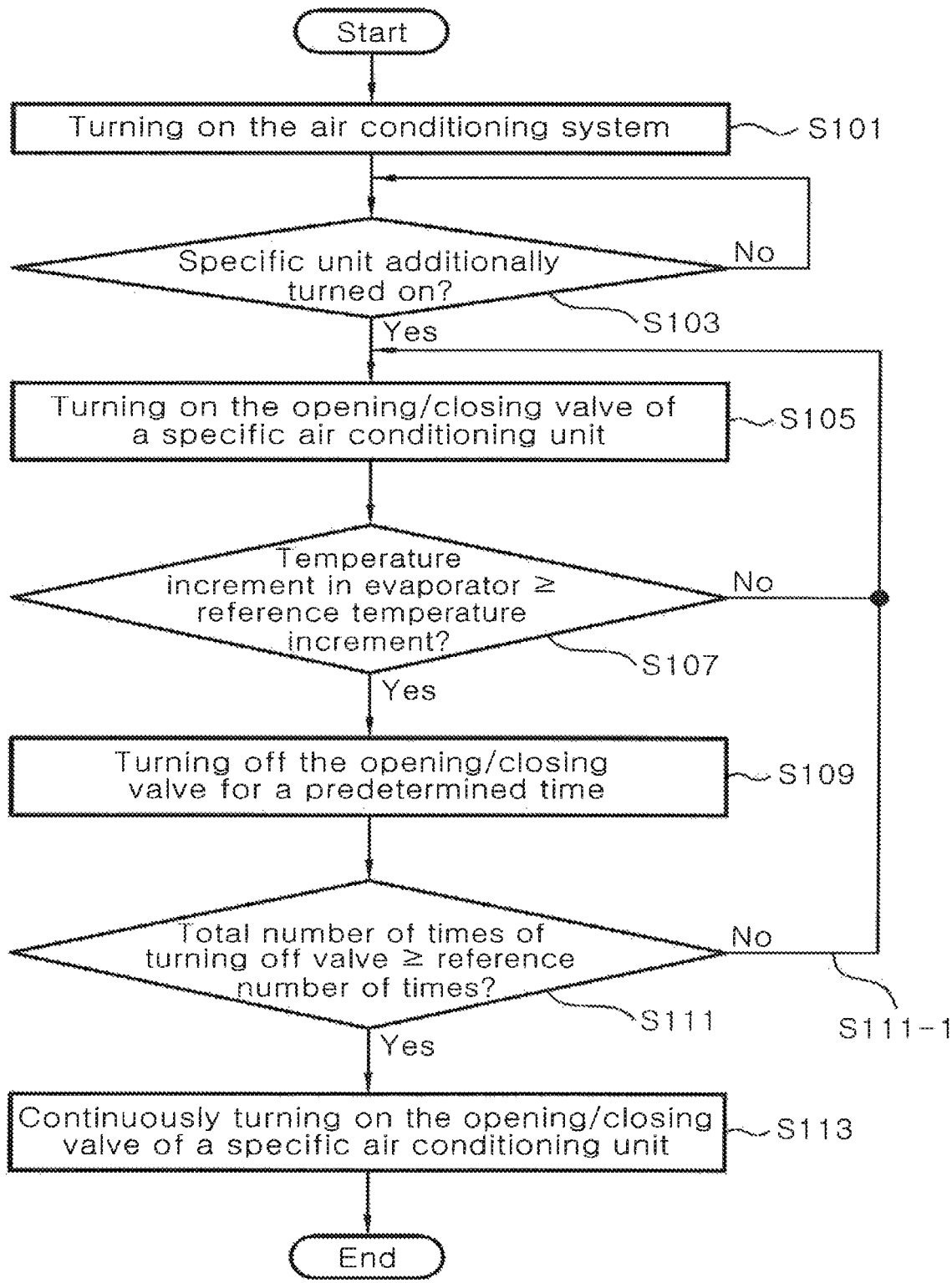
FIG. 11 is a flowchart showing an operation example of the air conditioning system for motor vehicles according to the second embodiment of the present invention and showing an operation example in which one of a plurality of air conditioning units is additionally operated (turned on).

First, an operation example when one of a plurality of air conditioning units 20, 30 and 40 is additionally operated (turned on) will be described with reference to FIG. 11.

The air conditioning system is turned on (S101). In this state, the microcomputer 52 determines whether a specific one of a plurality of air conditioning units 20, 30 and 40 is additionally operated (turned on) (S103).

For example, the microcomputer 52 determines whether at least one of the rear seat air conditioning unit 30 and the battery air conditioning unit 40 is additionally turned on in a state in which the front seat air conditioning unit 20 is turned on.

If it is determined that one of the rear seat air conditioning unit 30 and the battery air conditioning unit 40 is additionally turned on, the microcomputer 52 opens the opening/closing valve 32-1 of the rear seat air conditioning unit 30 (S105).

In this state, the microcomputer 52 determines for a predetermined, time (e.g., 5 second) whether the temperature increment in the evaporator 24 of the front seat air conditioning unit 20 is equal to or larger than a reference temperature increment, e.g., 5 degrees C. (S107).

If it is determined that the temperature increment in the evaporator 24 of the front seat air conditioning unit 20 is equal to or larger than 5 degrees C., the microcomputer 52 recognizes that a sudden decrease in refrigerant amount has occurred on the side of the front seat air conditioning unit 20 due to the supply of the refrigerant to the rear seat air conditioning unit 30. As a result of such recognition, the microcomputer 52 turns off the opening/closing valve 32-1 of the rear seat air conditioning unit 30 for a predetermined time, e.g., 5 seconds (S109).

Then, the supply of the refrigerant to the rear seat air conditioning unit 30 is stopped to prevent a sudden decrease in refrigerant amount on the side of the front seat air conditioning unit 20. As a result, it is possible to prevent a decrease in cooling performance in the front seat air conditioning unit 20 due to the decrease in refrigerant amount and to prevent a sudden increase in temperature of an air discharged toward the front seat region.

When a predetermined time, e.g., 5 seconds, elapses after the opening/closing valve 32-1 of the rear seat air conditioning unit 30 is turned off, the microcomputer 52 determines whether the total number of times of turning off the opening/closing valve 32-1 of the rear seat air conditioning unit 30 is equal to or larger than a predetermined reference number of times, e.g., two times (S111).

If it is determined that the total number of times of turning off the opening/closing valve 32-1 of the rear seat air conditioning unit 30 is equal to or larger than two times, the microcomputer 52 stops the repeated on/off operation of the opening/closing valve 32-1 of the rear seat air conditioning unit 30 and continuously turns on the opening/closing valve 32-1 (S113).

If it is determined that the total number of times of turning off the opening/closing valve 32-1 of the rear seat air conditioning unit 30 is smaller than two times, the microcomputer 52 turns on the opening/closing valve 32-1 of the rear seat air conditioning unit 30 again (S105).

Then, steps S107, S109 and S111 are repeated. By way of such repetition, the microcomputer 52 determines whether to control the repeated on/off operation of the opening/closing valve 32-1 of the rear seat air conditioning unit 30.

By controlling the repeated on/off operation of the opening/closing valve 32-1 of the rear seat air conditioning unit 30, it is possible to prevent a sudden decrease in refrigerant amount on the side of the front seat air conditioning unit 20. This makes it possible to a decrease in cooling performance of the front seat air conditioning unit 20 due to the decrease in refrigerant amount and to prevent an increase in temperature of an air discharged toward the front seat region.

Figure 12:
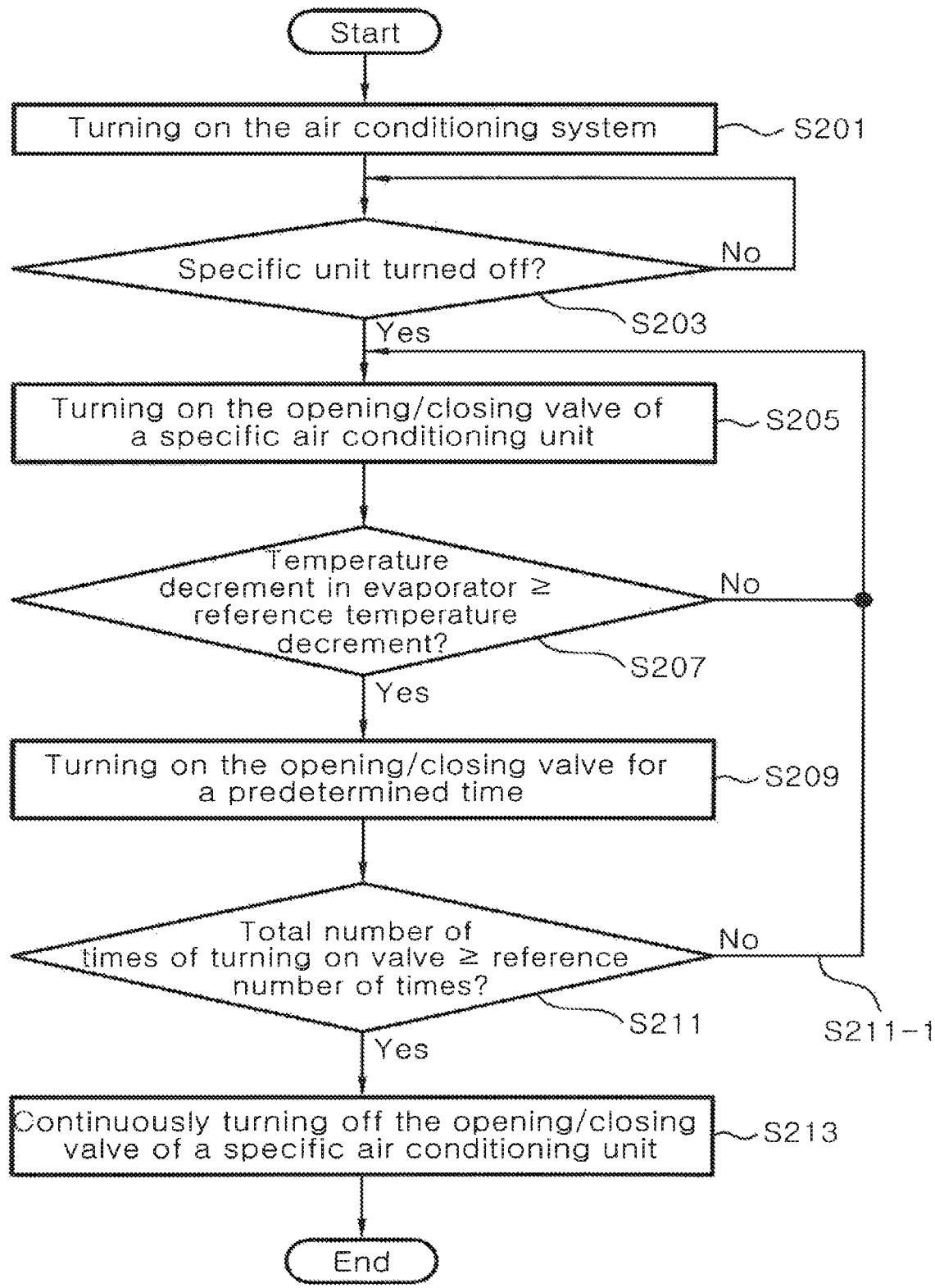
FIG. 12 is a flowchart showing an operation example of the air conditioning system for motor vehicles according to the second embodiment of the present invention and showing an operation example in which one of a plurality of air conditioning units is turned off.

Referring next to FIG. 12, description will be made on an example in which one of a plurality of air conditioning units 20, 30 and 40 is turned off.

First, the air conditioning system is turned on (S201). In this state, the microcomputer 52 determines whether a specific one of a plurality of air conditioning units 20, 30 and 40 is turned off (3203).

For example, the microcomputer 52 determines whether the rear seat air conditioning unit 30 is turned off in a state in which the front seat air conditioning unit 20 and the rear seat air conditioning unit 30 are turned on.

If it is determined that the rear seat air conditioning unit 30 is turned off, the microcomputer 52 closes the opening/closing valve 32-1 of the rear seat air conditioning unit 30 (S205).

In this state, the microcomputer 52 determines for a predetermined time (e.g., 5 second) whether the temperature decrement in the evaporator 24 of the front seat air conditioning unit 20 is equal to or larger than a reference temperature decrement, e.g., 5 degrees C. (S207).

If it is determined that the temperature decrement in the evaporator 24 of the front seat air conditioning unit 20 is equal to or larger than 5 degrees C., the microcomputer 52 recognizes that a sudden increase in refrigerant amount has occurred on the side of the front seat air conditioning unit 20 due to the stop of supply of the refrigerant to the rear seat air conditioning unit 30. As a result of such recognition, the microcomputer 52 turns on the opening/closing valve 32-1 of the rear seat air conditioning unit 30 for a predetermined time, e.g., 5 seconds (S209).

Then, the supply of the refrigerant to the rear seat air conditioning unit 30 is resumed to prevent a sudden increase in refrigerant amount on the side of the front seat air conditioning unit 20. As a result, it is possible to prevent an excessive increase in cooling performance of the front seat air conditioning unit 20 due to the increase in refrigerant amount and to prevent a sudden decrease in temperature of an air discharged toward the front seat region.

When a predetermined time, e.g., 5 seconds, elapses after the opening/closing valve 32-1 of the rear seat air conditioning unit 30 is turned on, the microcomputer 52 determines whether the total number of times of turning on the opening/closing valve 32-1 of the rear seat air conditioning unit 30 is equal to or larger than a predetermined reference number of times, e.g., two times (S211).

If it is determined that the total number of times of turning on the opening/closing valve 32-1 of the rear seat air conditioning unit 30 is equal to or larger than two times, the microcomputer 52 stops the repeated off/on operation of the opening/closing valve 32-1 of the rear seat air conditioning unit 30 and continuously turns off the opening/closing valve 32-1 (S213).

If it is determined that the total number of times of turning off the opening/closing valve 32-1 of the rear seat air conditioning unit 30 is smaller than two times (S21-1), the microcomputer 52 turns off the opening/closing valve 32-1 of the rear seat air conditioning unit 30 again (S205).

Then, steps S207, S209 and S211 are repeated. By way of such repetition, the microcomputer 52 determines whether to control the repeated off/on operation of the opening/closing valve 32-1 of the rear seat air conditioning unit 30.

By controlling the repeated off/on operation of the opening/closing valve 32-1 of the rear seat air conditioning unit 30, it is possible to prevent a sudden increase in refrigerant amount on the side of the front seat air conditioning unit 20. This makes it possible to an excessive increase in cooling performance of the front seat air conditioning unit 20 due to the increase in refrigerant amount and to prevent a decrease in temperature of an air discharged, toward the front seat region.

While some preferred embodiments of the present invention have been described above, the present invention is not limited to these embodiments. It is to be understood that various changes and modifications may be made without departing from the scope of the invention defined in the claims.

What is claimed is:

1. An air conditioning system for motor vehicles, comprising:
   a compressor; a condenser; a plurality of air conditioning units connected in parallel with each other with respect to the compressor and the condenser; and a flow rate control unit configured to, when a specific one of the plurality of air conditioning units is additionally turned on or is turned off, prevent occurrence of a sudden change in refrigerant amount in the remaining air conditioning units,
   wherein the flow rate control unit includes: a plurality of opening/closing valves controlled to cut off or permit a flow of a refrigerant to the plurality of air conditioning units; and a microcomputer configured to turn on and off the opening/closing valves two or more times at an initial time of turning on or off the opening/closing valves,
   wherein the microcomputer is configured to, when at least one of the air conditioning units not in a turned-on state is additionally turned on in a state in which one or more of the plurality of air conditioning units are already turned on, repeatedly turn on and off one of the opening/closing valves on the side of the additionallyturned-on air conditioning unit at a predetermined time interval for a predetermined time and then finally turn on one of the opening/closing valves on the side of the additionally-turned-on air conditioning unit.

2. The system of claim 1, wherein the microcomputer is configured to, when at least one of the plurality of air conditioning units not in a turned-on state is additionally turned on in a state in which one or more of the plurality of air conditioning units are already turned on, repeatedly turn on and off one of the opening/closing valves on the side of the additionally-turned-on air conditioning unit a predetermined number of times at a predetermined time interval and then finally turn on one of the opening/closing valves on the side of the additionally-turned-on air conditioning unit.

3. The system of claim 1, wherein the microcomputer is configured to, when at least one of the plurality of air conditioning units not in a turned-on state is additionally turned on in a state in which one or more of the plurality of air conditioning units are already turned on, repeatedly turn on and off one of the opening/closing valves on the side of the additionally-turned-on air conditioning unit, the microcomputer is configured to, when additionally turning on at least one of the plurality of air conditioning units, repeatedly turn on and off one of the opening/closing valves on the side of the additionally-turned-on air conditioning unit only when a temperature increment in an evaporator of each of the already-turned-on air conditioning units is equal to or larger than a predetermined reference temperature increment, and the microcomputer is configured to, when the temperature increment in the evaporator of each of the already-turned-on air conditioning units is smaller than the reference temperature increment, keep one of the opening/closing valves on the side of the additionally-turned-on air conditioning unit in a turned-on state.

4. The system of claim 1, wherein the microcomputer is configured to, when a specific one of the air conditioning units is turned off in a state in which two or more of the plurality of air conditioning units are turned on, repeatedly turn off and on one of the opening/closing valves on the side of the specific one of the air conditioning units a predetermined number of times at a predetermined time interval and then finally turn off one of the opening/closing valves on the side of the specific one of the plurality of air conditioning units.

5. The system of claim 1, wherein the microcomputer is configured to, when a specific one of the air conditioning units is turned off in a state in which two or more of the plurality of air conditioning units are turned on, repeatedly turn off and on one of the opening/closing valves on the side of the specific one of the plurality of air conditioning units at a predetermined time interval for a predetermined time and then finally turn off one of the opening/closing valves on the side of the specific one of the air conditioning units.

6. The system of claim 1, wherein the microcomputer is configured to, when a specific one of the plurality of air conditioning units is turned off in a state in which two or more of the plurality of air conditioning units are turned on, repeatedly turn off and on one of the opening/closing valves on the side of the specific one of the plurality of air conditioning units, the microcomputer is configured to, when turning off the specific one of the plurality of air conditioning units, repeatedly turn off and on one of the opening/closing valves on the side of the specific one of the air conditioning units only when a temperature decrement in an evaporator of each of the turned-on air conditioning units is equal to or larger than a predetermined reference temperature decrement, and the microcomputer is configured to, when the temperature decrement in the evaporator of each of the turned-on air conditioning units is smaller than the reference temperature decrement, keep one of the opening/closing valves on the side of the specific one of the plurality of air conditioning units in a turned-off state.

* * * * *